Figure 1:
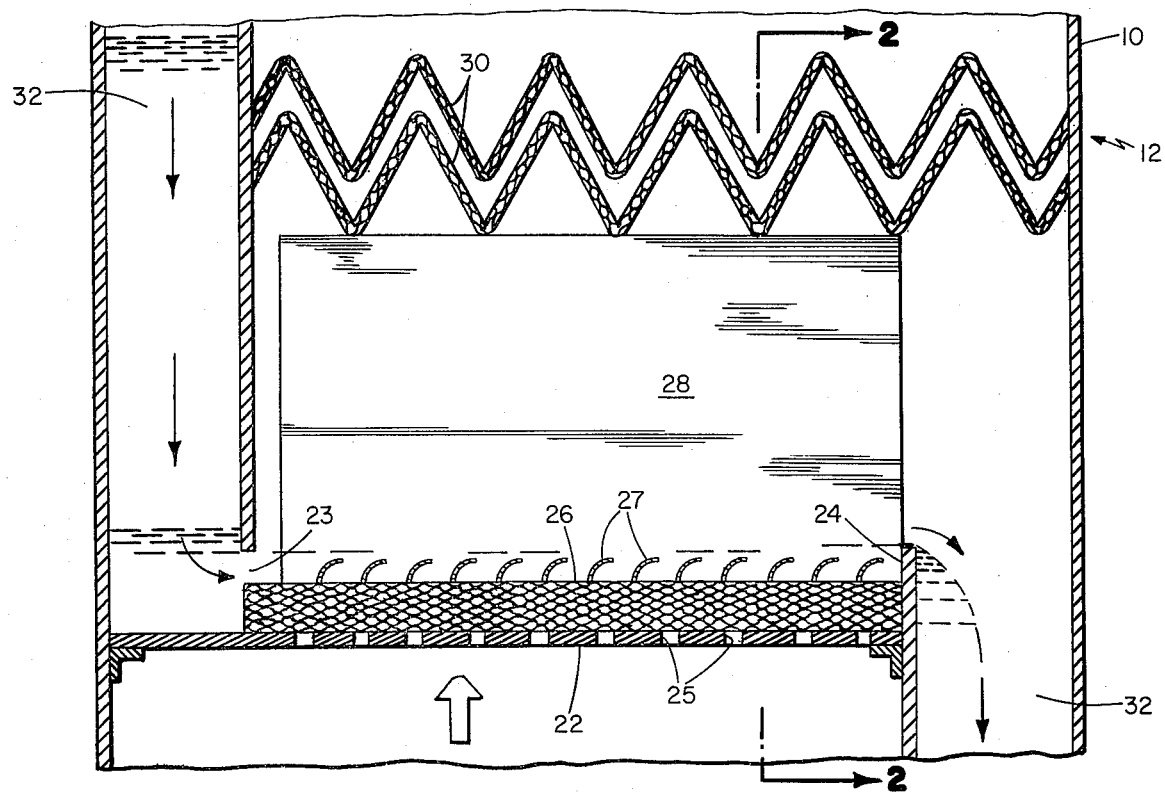

United States Patent [19]

Mix et al.

[11] 3,887,665
[45] June 3, 1975

[54] VAPOR-LIQUID CONTACTING

[76] Inventors: Thomas William Mix, 24 Atwood St., Wellesley, Mass. 02181; Alve John Erickson, 425 N. W. 3rd St., Chisholm, Minn. 55719

[22] Filed: Apr. 20, 1973

[21] Appl. No.: 352,927

[52] U.S. Cl.............. 261/114 R; 55/259; 202/158; 261/94
[51] Int. Cl............................................. B01f 3/09
[58] Field of Search......... 202/158, 197; 261/114 R, 261/94, 96; 55/259

[56] References Cited
UNITED STATES PATENTS

| | | | |
|---|---|---|---|
| 2,428,922 | 10/1947 | Shoresman | 261/114 R X |
| 3,017,950 | 1/1962 | Koshoot | 261/114 R X |
| 3,243,170 | 3/1966 | Ellis et al. | 261/94 |
| 3,593,497 | 7/1971 | Grimm et al. | 261/114 R X |
| 3,696,589 | 10/1972 | Liebig et al. | 261/96 X |

Primary Examiner—Frank W. Lutter
Assistant Examiner—William Cuchlinski, Jr.

[57] ABSTRACT

Vapor-liquid contacting device having a tray, separation means downstream of the tray, and damping means adjacent a surface of the tray to control and limit fluid oscillations and hence reduce the vapor velocity through the tray openings required to prevent dumping as well as reduce the pressure drop through the tray openings.

20 Claims, 2 Drawing Figures

PATENTED JUN 3 1975 3,887,665

VAPOR-LIQUID CONTACTING

This invention relates to vapor-liquid contacting, e.g., in a fractional distillation column.

One object of the invention is to provide for contacting fluids more efficiently and more uniformly with apparatus in which dumping is resisted despite relatively low vapor velocity through the tray openings. Other objects are to provide a column-like apparatus having low pressure drops relative to throughput and efficiency and high mass flows relative to column diameter and stage height. The apparatus of the present invention also provides reduced column height requirements for a contactor stage; reduced overall pressure drop for a given separation in a plate-type column; and reduced column volume requirements for a given separation, thus reducing the costs of the shell and the foundation associated with the housing and reducing column field installation costs; and increased ratio of plate to point efficiency in a cross-flow type device; and makes possible operation with higher liquid heads; all in a simple and reliable contacting device characterized by low tendency to weep, and good turndown capability.

In general, the invention features, in one aspect, a contact stage in the form of a tray supporting a two-phase fluid dispersion of vapor and liquid, i.e., froth for mass exchange; means disposed in close proximity to the tray for damping fluid flow oscillations impinging upon the tray, thereby permitting an increase in the open area of the tray and reduced vapor velocity through the tray openings without dumping; and vapor-liquid disengagement and separation means above the surface of the froth. In preferred embodiments the tray is a perforated plate with total area of the holes in the plate, or free area of the plate, from 15 to 55 percent of the total active area of the plate, preferably from 35 to 55 percent.

Preferably, the means for damping of fluid oscillations includes one or more layers of mesh comprising an open, interconnected cellular material with a void fraction in the range of 40 to 99 percent of its total apparent volume and a surface area per unit volume from 100 to 1,200 $ft^2/ft^3$. Knitted wire mesh, woven cloth, open-celled foam, and an open filamentary or fibrous felt or matting are examples of suitable materials. The mesh provides a matrix for retention of liquid in the vicinity of the plate and for liquid flow to the plate. The presence of the liquid in the matrix near the holes in the plate inhibits bubble growth and therefore reduces the magnitude of pressure pulsations due to bubble generation at the plate holes. The smaller bubbles also result in a significant increase in mass transfer. At the same time, pressure pulsations due to oscillations in the froth are damped and isolated from the holes in the plate by the liquid-loaded matrix. The depth of the matrix required to achieve the desired amount of damping will, in general, be less than 1 inch, and may be as little as one layer of screen. As the thickness of the damping layer decreases, the cell size must be decreased (surface area per unit volume must be increased) to maintain the same degree of damping. In the extreme case in which the matrix is a single layer of screen it should provide a surface tension effect sufficient to produce a pressure drop of at least 1 cm. of water; to such end the screen will have a mesh between 15 and 80, an open area between 30 and 75 percent, and a thickness of the order of 0.05 inch.

In another aspect of the invention, spaced generally parallel vertical sheets are located directly above the active area of the plate where, preferably in conjunction with the matrix, they control and limit fluid oscillations. These vertical sheets or flow control members extend in the flow direction across the active area of the plate, i.e., from weir to weir. They may be of any convenient thickness, of the order of one thirty-second inch or less when made of sheet metal, and are spaced from each other by a distance from one-fourth to 1 inch when used without the mesh and by up to 3 inches otherwise. Spacing between each pair of sheets need not be the same as between all other pairs, although approximate uniformity of spacing is usually desirable. The bottom edges of the sheets can be in direct contact with the upper surface of the tray, in which case the layer or layers of mesh extend between adjacent sheets, or the bottom edges can be spaced above the tray, in which case the layer or layers of mesh can extend continuously across the active area of the tray. The vertical height of the sheets, for best results, should be at least as great as the depth of the layer of froth on the tray and at least twice the maximum thickness of the layers of mesh. This depth will vary, of course, depending upon the particular liquid and vapor combination with which the apparatus is used as well as with rate of flow and other operating conditions, but in general effective results are achieved using sheets having a height from 2 to 12 inches.

The vapor-liquid disengagement and separation means may be of any conventional form. In one embodiment this may take the form simply of an unobstructed chamber or space between the upper edges of the sheets and the bottom of the next successive tray, in which case separation is accomplished merely through gravitational force acting preferentially on the liquid. In another embodiment any conventional centrifugal separator can be used downstream of the tray. In still another and preferred embodiment, the separator is in the form of a layer of pleated or zigzag folded mesh extending generally horizontally across the flow path above and downstream of each tray. Where desirable, hydraulic gradient in the froth can be counteracted by tilting the plate from the horizontal or by using directional vanes to enable the vapor to pump the liquid down the plate, or by a combination of these means.

In general, each stage of the column contains a tray in combination with means for controlling fluid oscillations in the direction of flow and with vapor-liquid separation means.

Figure 2:
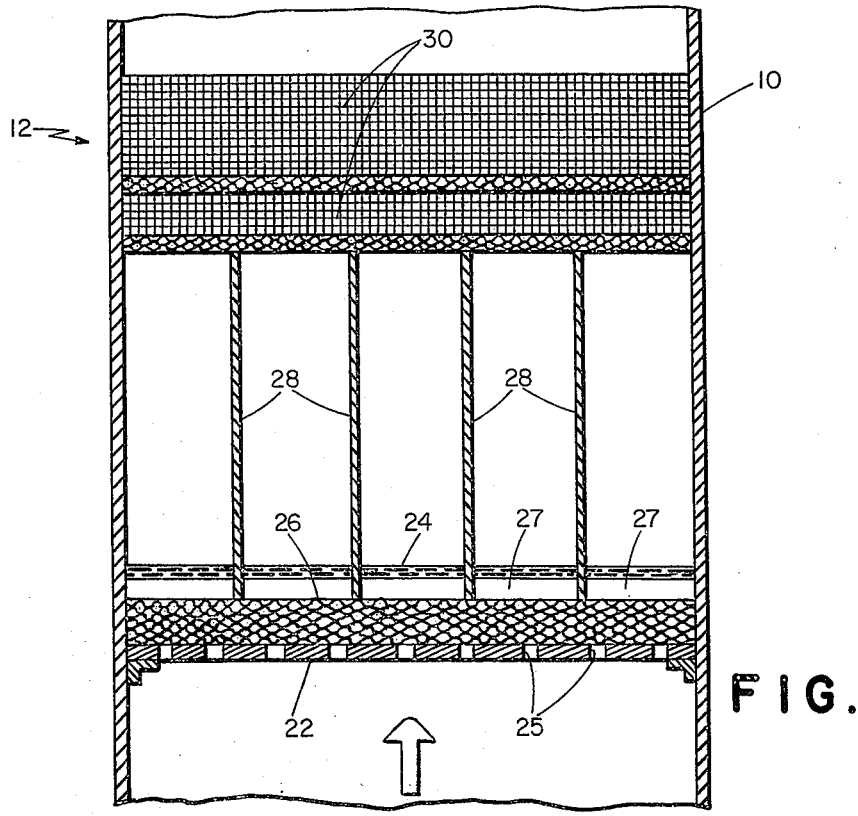

Other objects, features, and advantages will appear from the following description of a preferred embodiment of the invention taken together with the attached drawings, in which:

FIG. 1 is a vertical sectional view, broken away, of a contacting-separating device showing one complete stage; and FIG. 2 is a vertical sectional view taken along line 2—2 of FIG. 1.

Referring to the drawings, cylindrical housing 10 of liquid-vapor contacting and separating column 12 has a conventional central vapor inlet and reboiler (not shown) below its bottom stage. A series of contact stages is vertically arranged inside housing 10. Considering an intermediate stage shown as typical, a plate 22 extends across housing 10. The active section of the plate between inlet 23 and outlet weir 24 is perforated with 1/8 inch holes or apertures 25 on 3/16 inch centers. The area of the holes amounts to 40 percent of the total area of the active section of the plate (i.e., exclusive of the downcomer and weir areas). This high free area of the plate minimizes pressure drop across the plate due to dynamic head loss. Twenty layers of knitted wire mesh (York style 422) 26 are closely packed above the plate and cover the active area of the plate, serving to control and limit the vertical fluid oscillations arising from normal distillation plate operation. The mesh is preferably in direct contact with the plate, and in any event is sufficiently close to the plate (in general less than three-fourths inch) to serve its intended purpose of reducing and limiting the oscillations at the surface of the plate, thereby preventing weeping despite the high free area of the plate and the low velocity through the holes.

The mesh augments plate mass transfer significantly as well, particularly at higher $F$ numbers (where $F=j_g \sqrt{\rho_g}$ and $j_g$ is the superficial vapor velocity and $\rho_g$ is the vapor density), and helps make high efficiencies attainable even with low heads and high overall vapor rates. Aerodynamically shaped directional vanes 27 enable the vapor to pump the liquid down the plate, thereby counteracting the hydraulic gradient associated with flow of liquid from left to right as seen in FIG. 1, thereby to maintain a relatively constant froth height and liquid head over the active section of the plate between inlet 23 and outlet weir 24. Spaced generally parallel imperforate vertical sheets 28 are located directly above the mesh layers to limit and damp fluid oscillations further by subdivision of the liquid. These sheets 28 run in the direction of liquid flow across the plate. The sheets are about 8 inches high and are spaced on 2 inch centers at the center of the plate, more closely spaced at the inlet and outlet, and slightly curved to match the widening of the liquid flow area at the center of the tray. The sheets also enable nearly full realization of the increase in plate efficiency over point efficiency due to the cross-flow effect by minimizing liquid eddying and by-passing.

The preferred embodiment shown also includes downstream of the tray and of the means for controlling fluid oscillations a vapor-liquid separator means in the form of spaced layers of open cellular material 30, 30 pleated or folded in zigzag fashion and disposed generally horizontally and parallel to plate 22 transversely of the vapor-liquid flow path above sheets 28. Each layer 30 is of the same general construction and has the same general characteristics as the layer 26. The pleats or folds extend at an angle of approximately 60° to the horizontal, although this may vary from 45° to 75°. In the preferred embodiment shown, each layer 30 consists of eight sheets of woven wire mesh (York style 931). The zigzag pattern generates a vapor flow area significantly greater than the superficial column cross-section. The reduced velocity of the vapor normal to the mesh surface makes for more effective deentrainment and makes reentrainment less likely. The steep slope of the mesh sections gives a gravitational force for liquid drainage down the sides of the mesh of 0.87 times that of gravity and results in efficient liquid drainage down the sides of the mesh to the base of the mesh vees and from there back to the plate. This mesh also contributes significantly to plate mass transfer particularly at higher vapor rates where the liquid flow rate into the zigzag mesh is large.

Liquid accumulating on each plate 22 flows over outlet weir 24 and is transferred via downcomers 32, 32 to the next adjacent plate.

In operation, vapor to be processed is introduced under pressure through the inlet and, in general, rises through the active (perforated) area of plates 22, through the plate mesh 26, and through the zigzag deentrainment mesh 30 of successive stages. Condensed liquid flows through the downcomers 32 onto and across plates 22. At each stage, large-scale flow non-uniformities are prevented from occurring because of the effect of layer 26 and the spaced vertical sheets 28. These sheets and the plate mesh layer 26 damp the fluid oscillations on the plate and reduce the magnitude of the pressure fluctuations at the surface of the plate 22 and over the plate holes 25. This in turn permits a significant reduction in vapor velocity through the plate holes 25 without weeping or dumping. For a given superficial column vapor velocity, consequently, a much greater plate free area may therefore be used with consequently a much lower pressure loss due to hole velocity for that superficial velocity. If desired, therefore, the liquid head on the plate may be increased while still keeping overall pressure drop within acceptable bounds. The lower the surface tension and the higher the liquid head on the plate, the more tightly packed must the plate mesh be and the more layers of mesh which must be used to maintain plate operation without weeping for a given plate hole velocity.

More particularly, in one important aspect the damping advantages of the invention are realized during periods in which the apparatus is operated at a vapor velocity through the tray openings below that which would be required to prevent dumping or weeping through a conventional tray. Such low velocity operation will occur at the turndown point and in some cases even at the design point. Viewed in other terms, trays embodying the invention will have a dumping number $N_d$ [a number correlating the onset of weeping with vapor velocity and other parameters, defined as $N_d = (\rho_g K/\rho)(U^2/ga_o)^{4/5}$, where $\rho_g$=gas density, $\rho$=liquid density, U=mean vapor velocity through the plate orifices, $K=\Delta P/\rho_g U^2$ (where $\Delta P$ is the dry plate pressure drop), g=acceleration due to gravity, and $a_o$=radius of plate orifices, the definition being attributable to Kupferberg and Jameson in Trans. Inst. Chem. Eng., vol. 48, T140-T150 (1970)] relatively low by comparison with the dumping number required to prevent weeping through conventional trays. Typically, according to the invention, $N_d$ will be less than 0.7, e.g., as low as 0.3.

As the vapor leaves the surface of the froth, it may entrain a significant amount of liquid as droplets. The entrainment is greater the higher the superficial velocity of the vapor and the lower the surface tension of the system. The entrainment decreases with distance above the froth surface. As the vapor enters the zigzag mesh 30, the droplets strike, collect, and grow on the small wires of the deentrainment mesh. Gravity drains the liquid to the base of the zigzag mesh vees from which the liquid returns to the plate. Much of the liquid will drain down the vertical sheets 28 to the plate, reducing the likelihood of its being reentrained before returning to the froth. The slight resistance the mesh offers to the vapor flow causes the vapor to turn so that it tends to flow more at right angles to the mesh since this is the path of least resistance. Because of the zigzag configuration, the mesh has an area greater than the superficial column cross-section area and the vapor velocity normal to the mesh is therefore less than the superficial velocity. This lower velocity normal to the mesh reduces the likelihood of reentrainment. At the same time the steep slope of the zigzag elements causes the liquid to drain readily to the base of the vees and thence back to the plate.

Because of the lower vapor velocity normal to the mesh, and the rapid liquid drainage from the mesh, the zigzag configuration offers a major improvement in the performance of deentrainment mesh, enabling bulk deentrainment close to the froth surface at high superficial vapor velocities and with only moderate pressure drop across the mesh. Because of the high liquid circulation rates through the zigzag mesh, the composition of the liquid in the mesh is very close to that of the bulk liquid on the plate below. For this reason and because of the intimate contacting of vapor and liquid in the zigzag mesh, significant additional mass transfer occurs in the zigzag mesh.

Other embodiments (e.g., with purely countercurrent flow of vapor and liquid, or with the fluid oscillation damping means described herein applied to distillation trays other than perforated plates (e.g., valve trays), or with other conventional deentrainment means) will occur to those skilled in the art and are within the following claims.

What is claimed is:

1. In vapor-liquid contacting apparatus of the cross-flow type having a column housing and at least one contact stage in said housing, said apparatus including liquid and vapor inlets to said stage, and a liquid outlet from said stage, that improvement comprising
   an orificed tray mounted in said housing at said stage, between said inlets,
   said tray having free area comprising 15–55 percent of the total active area of the tray and being mounted with said free area in effective communication with both said inlets to permit vapor to rise through said tray to contact liquid thereabove and produce a two phase dispersion of vapor and liquid supported on said tray, and
   means disposed adjacent a surface of said tray at said free area, in effective communication with said vapor inlet and said liquid inlet, for damping fluid oscillations impinging upon said free area of said tray and for thereby reducing the vapor velocity through said free area required to prevent dumping.

2. Apparatus as claimed in claim 1 in which said tray comprises a perforated plate with open area from 35 to 55 percent of the total active area of the plate.

3. Apparatus as claimed in claim 1 wherein said means comprises a liquid retention matrix having a void fraction from 40 to 99 percent of its total apparent volume and a surface area from 100 to 1,200 square feet per cubic foot of apparent volume.

4. Apparatus as claimed in claim 3 wherein said matrix is a single layer of screening having a mesh between 15 and 80, and an open area between 30 and 75 percent.

5. Apparatus as claimed in claim 3 wherein said matrix comprises a multiplicity of layers of open, interconnected cellular mesh.

6. Apparatus as claimed in claim 3 wherein said means further comprises a plurality of spaced sheets extending in the direction of liquid flow across the tray, perpendicular to the tray, and above the upper surface of said matrix to a height at least twice the thickness of said matrix.

7. Apparatus as claimed in claim 3 wherein said apparatus further comprises directional vanes located directly above said liquid retention matrix to pump liquid down said tray.

8. Apparatus as claimed in claim 1 wherein said means comprises a plurality of spaced sheets extending in the direction of liquid flow across the tray and perpendicular to the plate, the spacing between sheets being no greater than 1 inch.

9. Apparatus as claimed in claim 1 further comprising downstream of said means a vapor-liquid separator comprising spaced, pleated, generally horizontal layers of open cellular material.

10. The improvement of claim 1 wherein said means is adjacent the upper surface of said tray.

11. In a vapor-liquid contacting process comprising supplying vapor through a tray in a contacting and separating stage of the cross-flow type having vapor and liquid inlets to said stage, that improvement comprising the steps of
    providing an orificed tray in said stage, between said inlets, said tray having free area comprising 15–55 percent of the total active area of the tray,
    mounting said tray with said free area in effective communication with both said inlets to permit vapor to rise through said tray to contact liquid thereabove and produce a two phase dispersion of vapor and liquid supported on said tray,
    providing means adjacent a surface of said tray at said free area, in effective communication with said vapor inlet and said liquid inlet, for damping fluid oscillations impinging upon said free area of said tray and for thereby reducing the vapor velocity through said free area required to prevent dumping, and
    passing vapor through the tray openings at a velocity below the minimum velocity required to prevent liquid dumping through the tray in the absence of said means.

12. The improvement of claim 11 wherein during operation at the turndown point said vapor is passed through said openings at a velocity below said minimum velocity.

13. The improvement of claim 11 wherein during operation at the design point said vapor is passed through said openings at a velocity below said minimum velocity.

14. The improvement of claim 11 further comprising using as the tray a perforated plate the active area of which is 15–55 percent open.

15. The improvement of claim 14 further comprising damping said oscillations sufficiently to bring $N_d$ below 0.7.

16. The improvement of claim 11 further comprising damping said fluid oscillations with a liquid retention matrix having a void fraction from 40 to 99 percent of its total apparent volume and a surface area from 100 to 1200 square feet per cubic foot of apparent volume.

17. The improvement of claim 16 further comprising using as said matrix a single layer of screening chosen to produce a surface tension effect sufficient to cause a pressure drop across the screen of at least 1 cm. of water.

18. The improvement of claim 16 further comprising using as said matrix a multiplicity of layers of open, interconnected cellular mesh.

19. The improvement of claim 11 further comprising damping said fluid oscillations with a plurality of spaced sheets extending in the direction of liquid flow across the tray and perpendicular to the tray, the spacing between sheets being no greater than 1 inch.

20. The improvement of claim 11 further comprising damping said fluid oscillations with the combination of a liquid retention matrix having a void fraction from 40 to 99 percent of its total apparent volume and a surface area from 100 to 1200 square feet per cubic foot of apparent volume, and a plurality of spaced sheets extending in the direction of liquid flow across the tray, perpendicular to the tray, and above the upper surface of said matrix to a height at least twice the thickness of said matrix.

* * * * *